US012736196B1

(12) United States Patent
Lee et al.

(10) Patent No.: US 12,736,196 B1
(45) Date of Patent: Sep. 15, 2026

(54) OPTICAL DEVICE AND VEHICLE EQUIPPED WITH THE SAME

(71) Applicant: HYUNDAI MOBIS CO., LTD., Seoul (KR)

(72) Inventors: In Sun Lee, Yongin-si (KR); Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/335,943

(22) Filed: Sep. 22, 2025

(30) Foreign Application Priority Data

Jun. 24, 2025 (KR) ........................ 10-2025-0083664

(51) Int. Cl.
*F21S 41/25* (2018.01)
*F21S 41/143* (2018.01)
*F21S 41/151* (2018.01)
*F21Y 113/00* (2016.01)

(52) U.S. Cl.
CPC ............. *F21S 41/25* (2018.01); *F21S 41/143* (2018.01); *F21S 41/151* (2018.01); *F21Y 2113/00* (2013.01)

(58) Field of Classification Search
CPC ......... F21S 41/25; F21S 41/143; F21S 41/151
See application file for complete search history.

(56) References Cited

U.S. PATENT DOCUMENTS 10,876,694 B2 * 12/2020 Courcier ............... F21S 41/255
2014/0133168 A1 * 5/2014 Fiederling ............... F21S 41/24 362/235
2017/0241607 A1 8/2017 Courcier
2018/0149336 A1 5/2018 Tsai et al.
2018/0187851 A1 * 7/2018 Hossfeld ................. F21S 45/48
2018/0187853 A1 * 7/2018 Schiccheri ................ F21V 5/04
2019/0145595 A1 5/2019 Takada et al.
(Continued)

FOREIGN PATENT DOCUMENTS

DE 102014210500 A1 12/2015
DE 102018104261 A1 8/2018
(Continued)

OTHER PUBLICATIONS

The Extended European Search Report dated Mar. 12, 2026 issued in European Patent Application No. 25205991.0.

*Primary Examiner* — Zheng Song
(74) *Attorney, Agent, or Firm* — Morgan Lewis & Bockius LLP

(57) ABSTRACT

Described is an optical device including a light source array that outputs light, a first lens assembly that is disposed in front of the light source array and emits light incident from the light source array frontwards thereof, a second lens assembly that is disposed in front of the first lens assembly and emits light incident from the first lens assembly frontwards, and a light emitting lens that forms a beam pattern using light incident from the second lens assembly, wherein the first lens assembly includes a plurality of collimator lenses corresponding to the light source array, wherein each of the plurality of collimator lenses includes an aspherical emission surface protruding convexly frontwards, and a pitch between adjacent two collimator lenses varies for each area. The optical device reduces manufacturing and assembly costs by simplifying a structure of a lamp for a vehicle.

17 Claims, 8 Drawing Sheets

(56) References Cited

U.S. PATENT DOCUMENTS

| | | | | |
|---|---|---|---|---|
| 2019/0145600 | A1* | 5/2019 | Spinger | F21S 41/25<br>362/277 |
| 2021/0199256 | A1* | 7/2021 | Son | F21S 41/147 |
| 2025/0305649 | A1 | 10/2025 | Kwon et al. | |

FOREIGN PATENT DOCUMENTS

| | | | | |
|---|---|---|---|---|
| DE | 202024106122 | U1 | 1/2025 | |
| EP | 3719391 | B1 * | 5/2022 | F21S 41/151 |
| WO | WO-2018065278 | A1 * | 4/2018 | F21V 19/0015 |

* cited by examiner

OPTICAL DEVICE AND VEHICLE EQUIPPED WITH THE SAME

This application claims the benefit of Korean Patent Application No. 10-2025-0083664, filed on Jun. 24, 2025, which is hereby incorporated by reference as if fully set forth herein.

BACKGROUND OF THE DISCLOSURE

Field of the Disclosure

The present disclosure relates to an optical device and a vehicle equipped with the same capable of reducing manufacturing and assembly costs by simplifying a structure of a lamp for a vehicle.

Discussion of the Related Art

In general, a vehicle is equipped with various lamps for irradiating light frontwards based on an external environment and time to secure a driver's field of view and informing another vehicle of a travel path of the vehicle.

Such lamps are categorized based on a purpose of use, and include a headlamp having a purpose of irradiating light frontwards, a turn signal having a purpose of securing the driver's field of view and informing a position of the vehicle, a fog light having a purpose of securing the driver's field of view and informing the position of the vehicle in addition to the headlamp in case of fog or rain, a reversing light that is turned on when the vehicle moves rearwards, a brake light that is turned on when the driver operates a brake, and the like.

Halogen bulbs have been mainly used in existing vehicle lamps. When the halogen lamp is used as a light source, there is a reflector that reflects light emitted from the halogen lamp, and reflected light is irradiated frontwards via the reflector. Although the halogen lamp has an advantage of being inexpensive, but has disadvantages in that heat is severely generated during use and a luminance is low and a lifespan is short compared to an amount of electricity used.

To solve such problems, a vehicle lamp using a light emitting diode (LED) has emerged. The LED lamp has high luminance, has a long lifespan, and is operated with low power.

In general, the headlamp is for securing a front view of the driver, and is implemented to select and operate a low beam or a high beam. In this regard, the low beam is mainly used not to interfere with visibility of a driver in a counterpart vehicle when the counterpart vehicle is present in the front, and the high beam is used to secure a clearer front view when the counterpart vehicle is not present in the front.

However, when the driver manually alternates between the low beam and the high beam while driving the vehicle, there is a problem in that safe driving is hindered. Therefore, to prevent such a problem, an adaptive driving beam (ADB) headlamp technology that may be implemented to operate the high beam at all times without glare of an opposite vehicle and a preceding vehicle has been developed.

That is, the ADB headlamp is a vehicle lamp in which multiple LEDs are independently turned on and off, and thus the high beam is illuminated to an area excluding an opposite vehicle area and a preceding vehicle area recognized via a front camera, thereby improving visibility of the driver.

However, in this case, light sources for implementing the low beam and the high beam should be installed separately, and because of complexity of a lens structure, there is a limitation in a degree of freedom in design and there is a problem in that a manufacturing cost is increased. Accordingly, there is a need for a means capable of simplifying the structure of the ADB headlamp while solving the above-described problems.

SUMMARY OF THE DISCLOSURE

The present disclosure aims to provide an optical device and a vehicle equipped with the same, and more particularly, an optical device and a vehicle equipped with the same capable of reducing manufacturing and assembly costs by simplifying a structure of a lamp for a vehicle.

In addition, the present disclosure aims to provide an optical device and a vehicle equipped with the same capable of implementing a bi-function lamp via a shape of a lens while arranging LEDs of a light source array on the same plane.

Problems to be solved by the present disclosure are not limited to the problems mentioned above, and other problems not mentioned will be clearly understood by those skilled in the art to which the present disclosure belongs from the following description.

Provided is an optical device including a light source array that outputs light, a first lens assembly that is disposed in front of the light source array and emits light incident from the light source array frontwards thereof, a second lens assembly that is disposed in front of the first lens assembly and emits light incident from the first lens assembly frontwards, and a light emitting lens that forms a beam pattern using light incident from the second lens assembly, wherein the first lens assembly includes a plurality of collimator lenses corresponding to the light source array, wherein each of the plurality of collimator lenses includes an aspherical emission surface protruding convexly frontwards, and a pitch between adjacent two collimator lenses varies for each area.

A pitch between adjacent two collimator lenses positioned at a center among the plurality of collimator lenses may be equal to or greater than a reference value.

The reference value may be a minimum value allowing light emitted from collimator lenses adjacent to collimator lenses positioned at a center to pass through the second lens assembly, without being incident on the light emitting lens.

A pitch between adjacent two collimator lenses positioned at a center among the plurality of collimator lenses may be greater than a pitch between adjacent two collimator lenses positioned at each of first and second edges in a left and right direction.

The pitch between the adjacent two collimator lenses among the plurality of collimator lenses may gradually decrease from the center to said both edges in the left and right direction.

The second lens assembly may include an aspherical upper incident surface protruding convexly rearwards thereof and a lower incident surface forming a continuous surface with the upper incident surface.

A curvature in a vertical direction from a center of the upper incident surface and a curvature in the vertical direction from a center of the lower incident surface may be different from each other.

The lower incident surface may include an aspherical shape protruding convexly rearwards or recessed concavely frontwards.

The lower incident surface may include a curved shape curved in a front and rear direction.

The second lens assembly may be formed by bonding an upper lens having the upper incident surface formed thereon with a lower lens having the lower incident surface formed thereon.

Provided is a vehicle including a vehicle body, a lamp structure positioned on a front surface of the vehicle body, and an optical device embedded in the lamp structure, wherein the optical device includes a light source array that outputs light, a first lens assembly that is disposed in front of the light source array and emits light incident from the light source array frontwards thereof, a second lens assembly that is disposed in front of the first lens assembly and emits light incident from the first lens assembly frontwards, and a light emitting lens that forms a beam pattern using light incident from the second lens assembly, wherein the first lens assembly includes a plurality of collimator lenses corresponding to the light source array, wherein each of the plurality of collimator lenses includes an aspherical emission surface protruding convexly frontwards, wherein a pitch between adjacent two collimator lenses positioned at a center among the plurality of collimator lenses is equal to or greater than a reference value.

The optical device and the vehicle equipped with the same according to the present disclosure may reduce the manufacturing and assembly costs by simplifying the structure of the lamp for the vehicle.

In addition, the bi-function lamp may be implemented via the shape of the lens while arranging the LEDs of the light source array on the same plane.

Effects obtainable in the present disclosure are not limited to the effects mentioned above, and other effects not mentioned may be clearly understood by those skilled in the art to which the present disclosure pertains from the following description.

DETAILED DESCRIPTION OF THE DISCLOSURE

Figure 1:
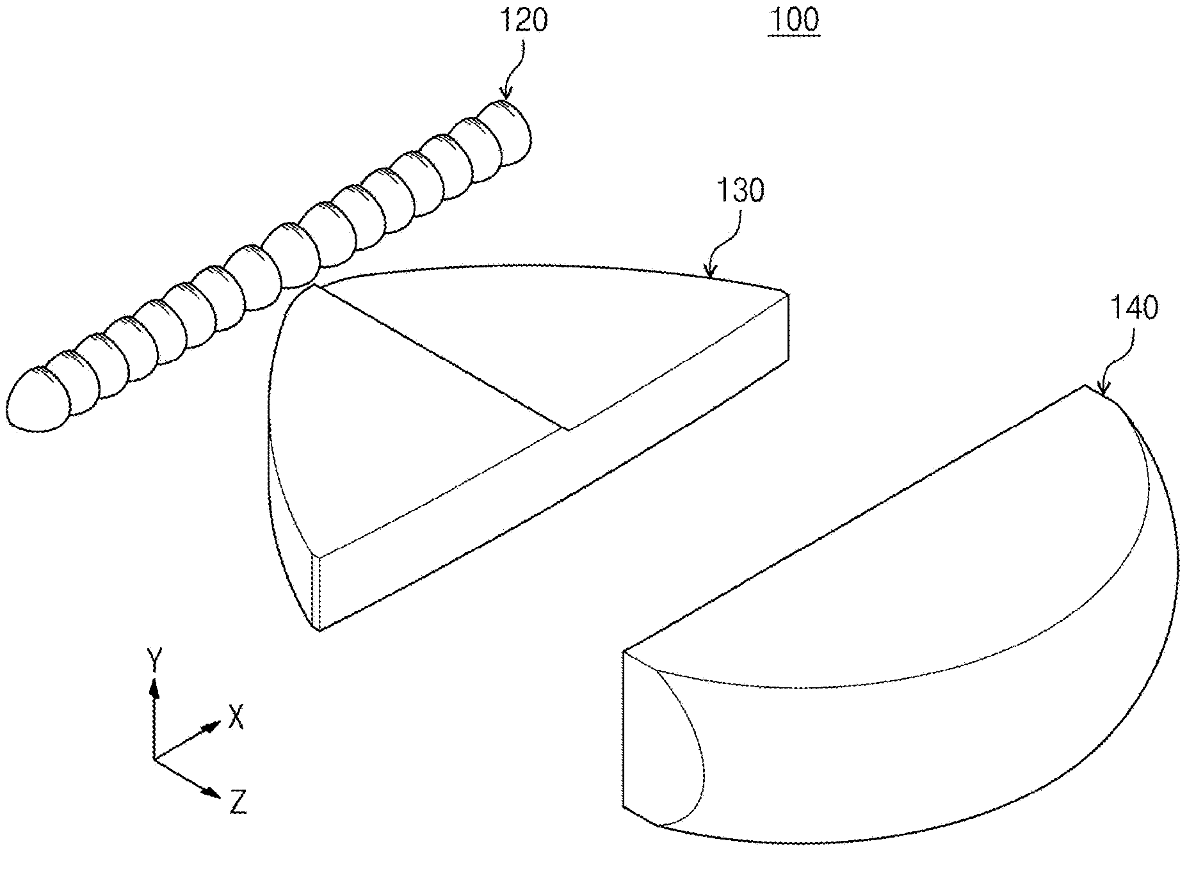
FIG. 1 is a perspective view illustrating an optical device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. Names of the respective elements used in the following explanations may be selected only for convenience of writing the specification and may be thus different from those used in actual products. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

The shapes, sizes, dimensions (e.g., length, width, height, thickness, radius, diameter, area, etc.), ratios, angles, number of elements, ratios, angles, numbers, and the like, which are illustrated in the drawings to describe various example embodiments of the present disclosure are merely given by way of example. Therefore, the present disclosure is not limited to the illustrations in the drawings. Any implementation described herein as an "example" is not necessarily to be construed as preferred or advantageous over other implementations.

The word "exemplary" is used to mean serving as an example or illustration. Embodiments are example embodiments. Aspects are example aspects. Any implementation described herein as an "example" is not necessarily to "Embodiments," "examples," "aspects," and the like should not be construed as preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

The terms, such as "below," "lower," "above," "upper" and the like, may be used herein to describe a relationship between element(s) as illustrated in the drawings. It will be understood that the terms are spatially relative and based on the orientation depicted in the drawings.

In addition, when any dimensions, relative sizes etc. are mentioned, it should be considered that numerical values for an elements or characteristics, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Characteristics of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Figure 2:
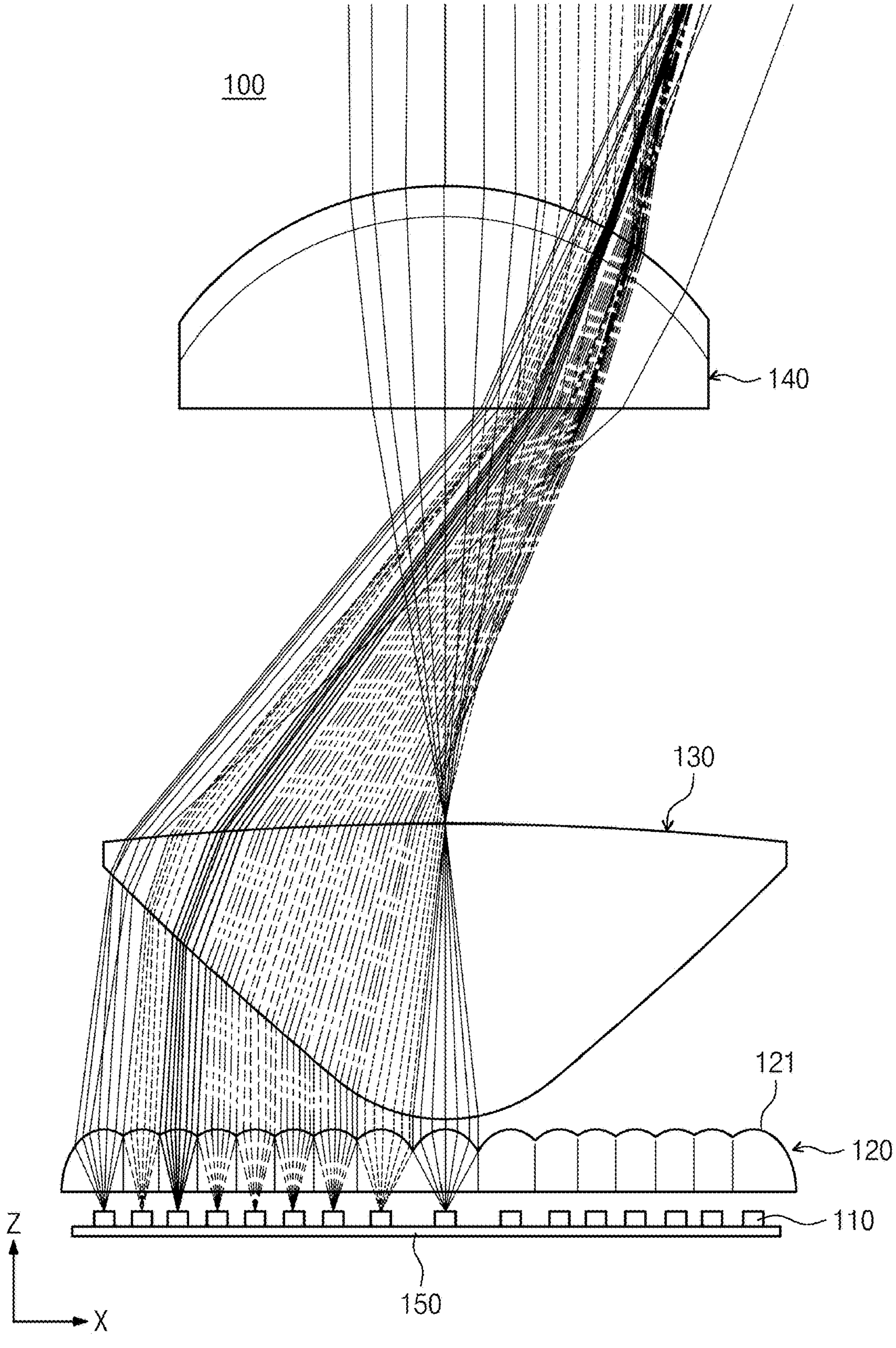
FIG. 2 is a top view of an optical device according to an embodiment of the present disclosure.
Figure 3:
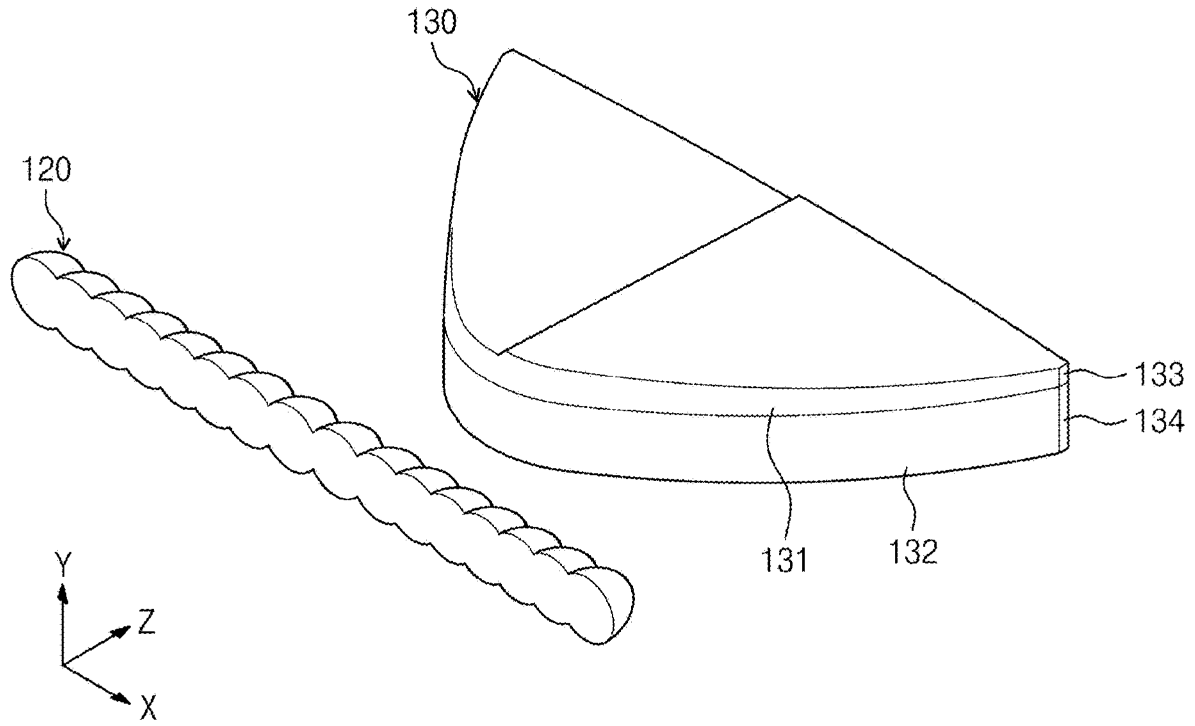
FIG. 3 is a perspective view illustrating a first lens assembly and a second lens assembly in an optical device according to an embodiment of the present disclosure.
Figure 4:
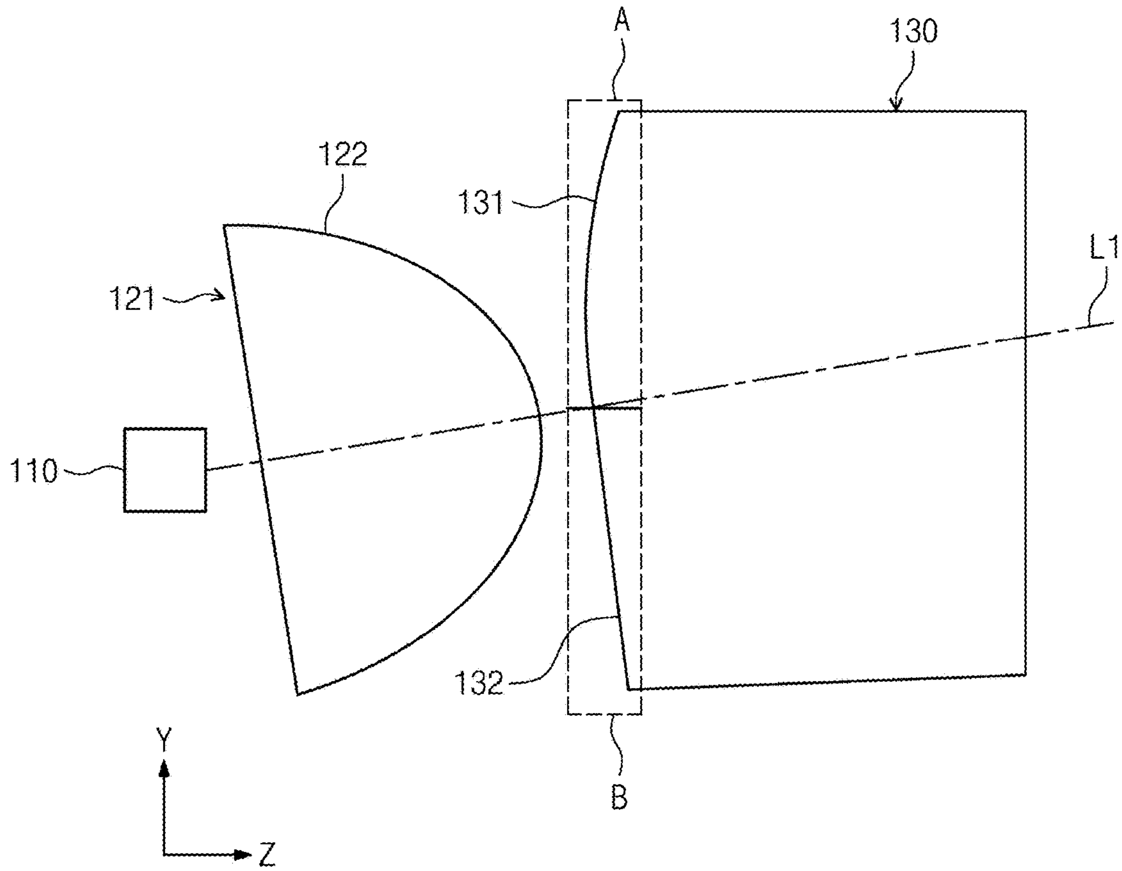
FIG. 4 is a diagram illustrating an upper incident surface and a lower incident surface of a second lens assembly in an optical device according to an embodiment of the present disclosure.
Figure 5:
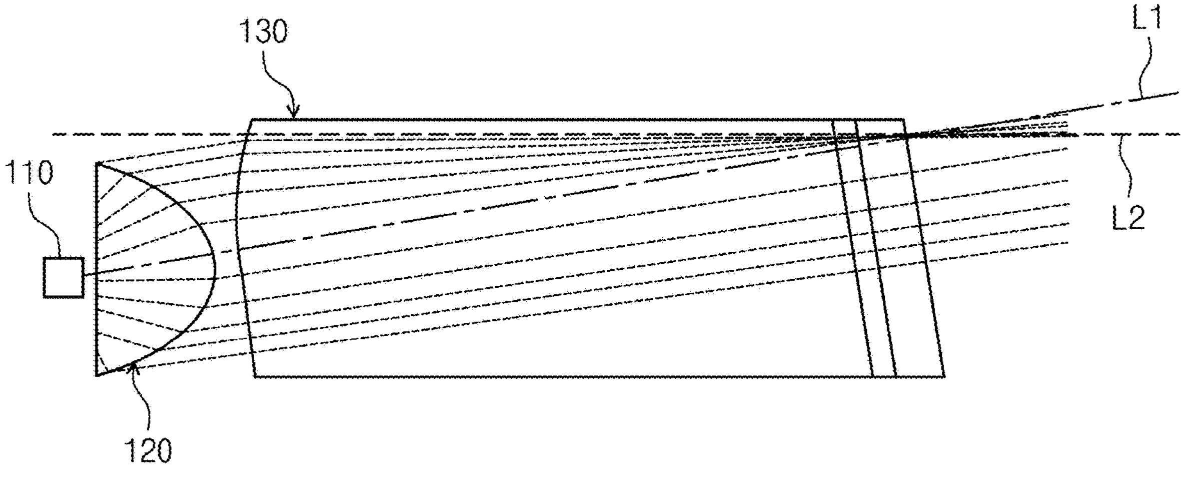
FIG. 5 is a diagram for illustrating a characteristic of implementing a bi-function lamp via an optical device according to an embodiment of the present disclosure.

FIG. 1 is a perspective view illustrating an optical device 100 according to an embodiment of the present disclosure. FIG. 2 is a top view of the optical device 100 according to an embodiment of the present disclosure. FIG. 3 is a perspective view illustrating a first lens assembly 120 and a second lens assembly 130 in the optical device 100 according to an embodiment of the present disclosure. FIG. 4 is a diagram illustrating an upper incident surface 131 and a lower incident surface 132 of the second lens assembly 130 in the optical device 100 according to an embodiment of the present disclosure. FIG. 5 is a diagram for illustrating a characteristic of implementing a bi-function lamp via the optical device 100 according to an embodiment of the present disclosure.

Referring to FIGS. 1 to 5 together, the optical device 100 according to an embodiment of the present disclosure may include a light source array 110, the first lens assembly 120, the second lens assembly 130, and a light emitting lens 140. Here, the optical device 100 according to the present disclosure may be embedded in a lamp structure located on a front surface of a vehicle body, and may function as an adaptive driving beam (ADB) headlamp.

As described above, the headlamp is for securing the front view of the driver, and is implemented to select and operate the low beam or the high beam. In this regard, the low beam is mainly used not to interfere with the visibility of the driver in the counterpart vehicle when the counterpart vehicle is present in the front, and the high beam is used to secure the clearer front view when the counterpart vehicle is not present in the front.

However, when the driver manually alternates between the low beam and the high beam while driving the vehicle, there is the problem in that the safe driving is hindered. Therefore, to prevent such a problem, the ADB headlamp technology that may be implemented to operate the high beam at all times without the glare of the opposite vehicle and the preceding vehicle has been developed.

That is, the ADB headlamp is the vehicle lamp in which the multiple LEDs are independently turned on and off, and thus the high beam is illuminated to the area excluding the opposite vehicle area and the preceding vehicle area recognized via the front camera, thereby improving the visibility of the driver.

However, in this case, the light sources for implementing the low beam and the high beam should be installed separately, and because of the complexity of the lens structure, there is the limitation in the degree of freedom in the design and there is the problem in that the manufacturing cost is increased. Accordingly, the optical device 100 according to an embodiment of the present disclosure aims to simplify the structure of the ADB headlamp while solving the above-described problems.

In the optical device 100 according to an embodiment of the present disclosure, the light source array 110 may serve to output light. The light source may include the LED as described above.

In addition, in the optical device 100 according to an embodiment of the present disclosure, to perform the function of the ADB headlamp, the multiple LEDs of the light source array 110 may be independently turned on and off. Further, each of the multiple LEDs independently turned on and off may form a segment pattern.

In this regard, the LEDs of the light source array 110 may be disposed on the same plane by being spaced apart from each other in a left and right direction (an x-axis direction) as shown in FIG. 2. Further, the optical device 100 according to an embodiment of the present disclosure may further include a printed circuit board 150, and the light source array 110 may be mounted on a front surface of the printed circuit board 150.

Therefore, the optical device 100 according to an embodiment of the present disclosure does not need to separately install the light sources for implementing the low beam and the high beam, thereby simplifying the structure of the ADB headlamp.

The first lens assembly 120 may be disposed in front (a z-axis direction) of the light source array 110 and may serve to emit light incident from the light source array 110 frontwards (the z-axis direction). Here, the first lens assembly 120 may be formed as a plurality of collimator lenses 121 corresponding to the light source array 110. Further, each of the plurality of collimator lenses 121 may include an aspherical emission surface 122 protruding convexly in the frontward direction (the z-axis direction).

Accordingly, the first lens assembly 120 may serve to collect light output from the light source array 110 and guide the light to the second lens assembly 130. In addition, a size of the above-described segment pattern may be determined via each of the plurality of collimator lenses 121.

In addition, the second lens assembly 130 may be disposed in front (the z-axis direction) of the first lens assembly 120 and may serve to emit light incident from the first lens assembly 120 frontwards (the z-axis direction). The light emitting lens 140 may serve to form a beam pattern using light incident from the second lens assembly 130. Here, the beam pattern may be formed by a combination of the segment patterns formed by the independent turning on/off of the LEDs of the light source array 110 described above.

In the optical device 100 according to an embodiment of the present disclosure, the second lens assembly 130 may include the aspherical upper incident surface 131 convexly protruding rearwards (the z-axis direction) and the lower incident surface 132 forming a surface continuous to the upper incident surface 131. In addition, a maximum luminous intensity may be determined via the shape of the upper incident surface 131. In addition, an irradiation angle of the above-described segment pattern may be determined via the shape of the lower incident surface 132.

Therefore, as illustrated in FIG. 4, in the optical device 100 according to an embodiment of the present disclosure, incident surface shapes of an upper area A and a lower area B of the second lens assembly 130 may be different from each other. In addition, a curvature in a vertical direction (a y-axis direction) from a center of the upper incident surface 131 may be different from a curvature in the vertical direction (the y-axis direction) from a center of the lower incident surface 132.

Furthermore, in the optical device 100 according to an embodiment of the present disclosure, the lower incident surface 132 may include an aspherical shape that protrudes convexly rearwards (the z-axis direction) or is recessed concavely frontwards (the z-axis direction). In addition, the lower incident surface 132 may have a curved shape curved in a front and rear direction (the z-axis direction).

Additionally, in the optical device 100 according to an embodiment of the present disclosure, the second lens assembly 130 may be formed by bonding an upper lens 133 having the upper incident surface 131 with a lower lens 134 having the lower incident surface 132.

More specifically, as illustrated in FIG. 4, the optical device 100 according to an embodiment of the present disclosure may rotate an optical axis L1 of the first lens assembly 120 and the second lens assembly 130. The rotation of the optical axis L1 as such may be implemented, for example, via a structure in which the first lens assembly 120 or the second lens assembly 130 is tilted. In addition, as illustrated in FIG. 5, the optical axis L1 of the first lens assembly 120 and the second lens assembly 130 may be located downward of an optical axis L2 of the light emitting lens 140.

Therefore, in the optical device 100 according to an embodiment of the present disclosure, the lightings of the light source array 110 may be arranged on the same plane and implement the high beam and the low beam via the shapes of the upper incident surface 131 and the lower incident surface 132 of the second lens assembly 130 and the rotation of the optical axis L1 of the first lens assembly 120 and the second lens assembly 130.

In addition, in the optical device 100 according to an embodiment of the present disclosure, the LEDs of the light source array 110 may be disposed on the same plane, and the high beam and the low beam may be implemented only with the single light emitting lens 140 via the shape of the second lens assembly 130, thereby implementing a bi-function lamp structure.

Figure 6:
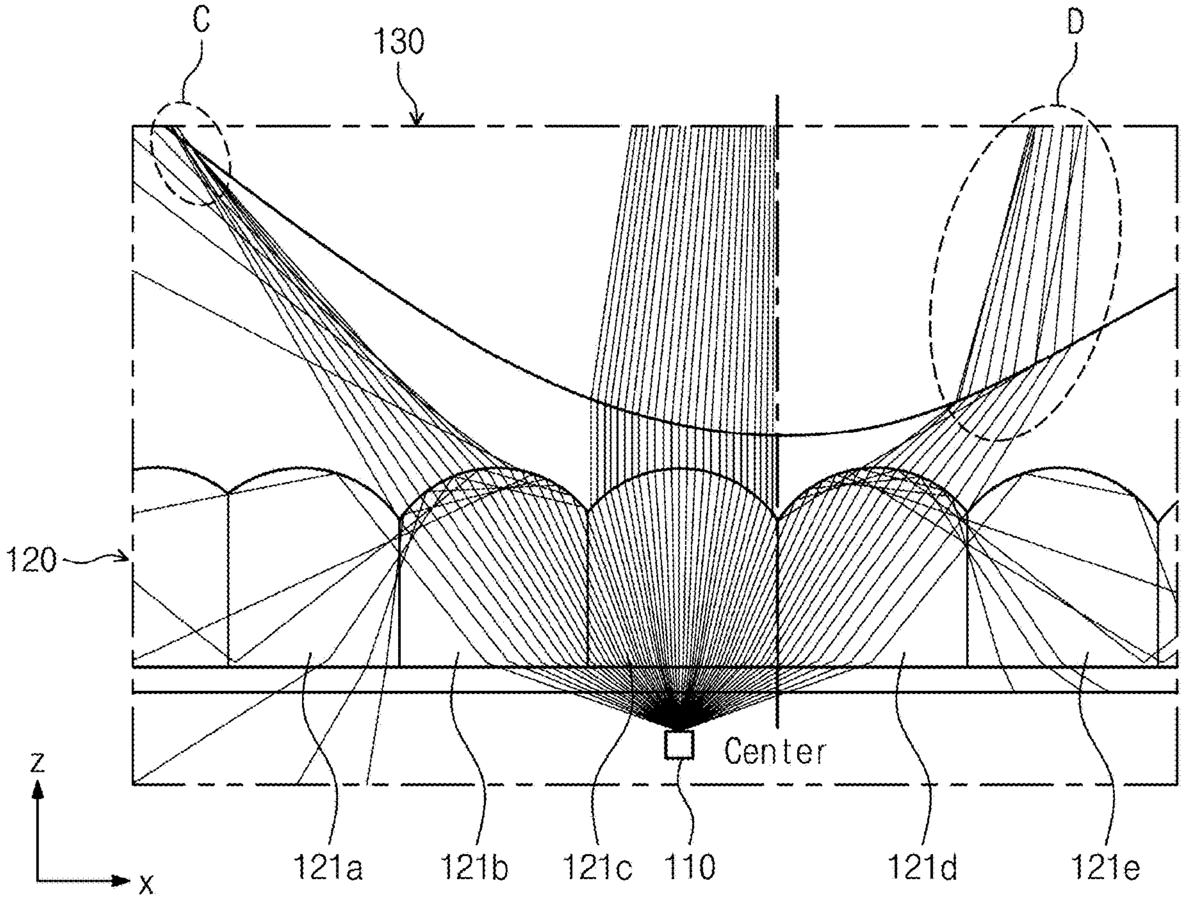
FIGS. 6 and 7 are diagrams for illustrating a characteristic of forming a pitch between a pair of collimator lenses adjacent to each other in an optical device according to an embodiment of the present disclosure.
Figure 7:
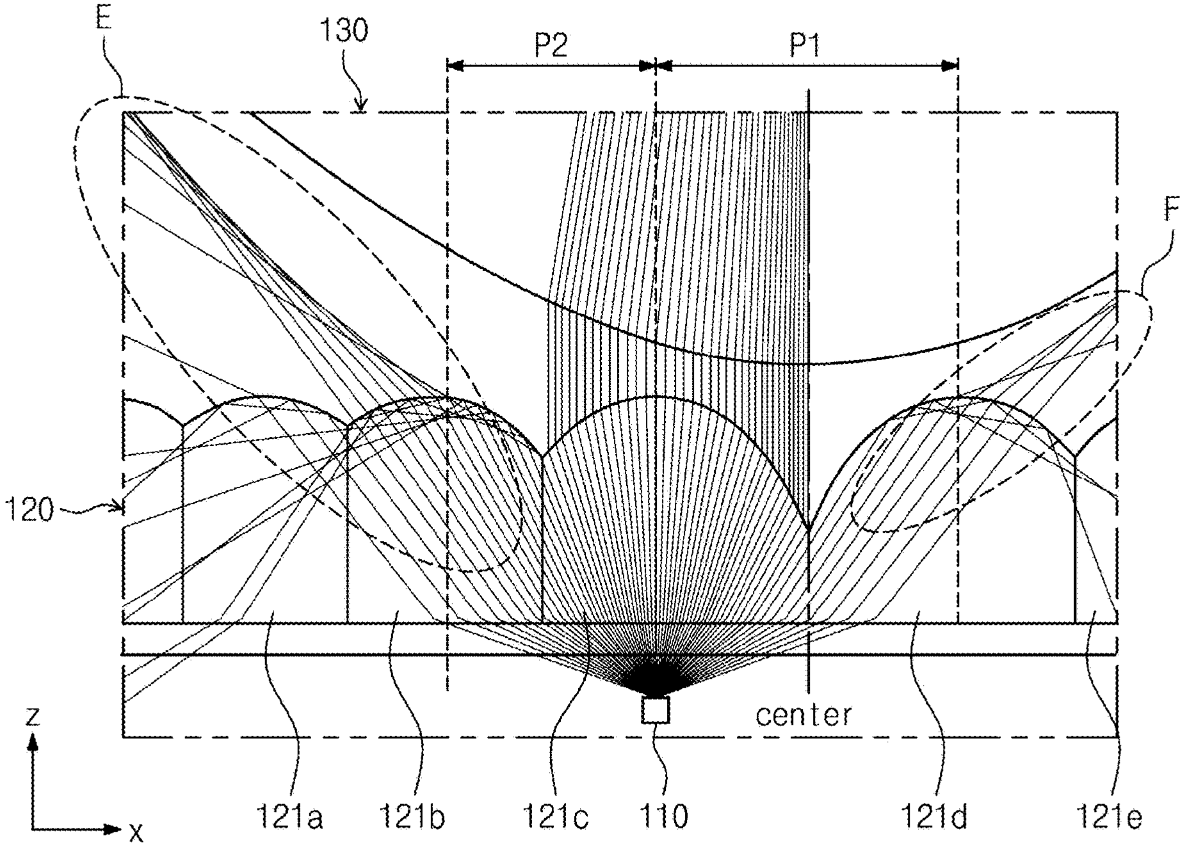

FIGS. 6 and 7 are diagrams for illustrating a characteristic of forming a pitch between a pair of collimator lenses 121 adjacent to each other in the optical device 100 according to an embodiment of the present disclosure.

As described above with reference to FIGS. 1 to 3, in the optical device 100 according to an embodiment of the present disclosure, the first lens assembly 120 may be composed of the plurality of collimator lenses 121 corresponding to the light source array 110. Each of the plurality of collimator lenses 121 may include the aspherical emission surface 122 protruding convexly frontwards (the z-axis direction).

In addition, as illustrated in FIG. 6, in the optical device 100 according to an embodiment of the present disclosure, the first lens assembly 120 may be formed such that a center between collimator lenses 121*c* and 121*d* adjacent to each other is formed at a position corresponding to a center of the second lens assembly 130. In addition, a beam pattern having a relatively uniform illuminance may be formed via the collimator lenses 121*c* and 121*d* that affect a central luminous intensity.

However, as illustrated in FIG. 6, as a plurality of collimator lenses 121*a*, 121*b*, 121*c*, 121*d*, and 121*e* are formed to overlap each other, light output from an LED 110 corresponding to the collimator lens 121*c* located at the center may be incident on the collimator lenses 121*b* and 121*d* adjacent to the collimator lens 121*c*. Light may be emitted via emission surfaces of the adjacent collimator lenses 121*b* and 121*d*.

In this case, light emitted via the emission surfaces of the adjacent collimator lenses 121*b* and 121*d* may be incident on the second lens assembly 130. This is illustrated in an area C and an area D in FIG. 6. That is, as unintended paths of light are formed, light emitted from the adjacent collimator lenses 121*b* and 121*d* may be transmitted to the light emitting lens 140 and cause the glare phenomenon. Thus, a quality of the ADB headlamp is deteriorated.

Further, such a glare phenomenon occurs most greatly at collimator lenses adjacent to the collimator lenses 121*c* and 121*d* located at the center among the plurality of collimator lenses 121*a*, 121*b*, 121*c*, 121*d*, and 121*e*.

FIG. 7 is a diagram for illustrating a characteristic of the optical device 100 according to the present disclosure for minimizing the occurrence of glare described above with reference to FIG. 6.

The optical device 100 according to an embodiment of the present disclosure may solve the above-described problem of the glare phenomenon by forming a pitch P1 between a pair of collimator lenses 121*c* and 121*d* located at the center among the plurality of collimator lenses 121*a*, 121*b*, 121*c*, 121*d*, and 121*e* to be equal to or greater than a reference value.

That is, as shown in FIG. 7, by securing the pitch P1 between the pair of collimator lenses 121*c* and 121*d* located at the center to be equal to or greater than the reference value, the paths of light output from the LED 110 and emitted via the emission surfaces of the adjacent collimator lenses 121*b* and 121*d* may be controlled. Here, the reference value may be a minimum value at which light emitted from the collimator lenses 121*b* and 121*d* adjacent to the collimator lenses 121*c* and 121*d* located at the center passes through the second lens assembly 130 but is not incident on the light emitting lens 140.

For example, light emitted via the adjacent collimator lenses 121*b* and 121*d* may form light paths while securing a sufficient emission angle as shown in an area E and an area F in FIG. 7. Accordingly, light emitted via the adjacent collimator lenses 121*b* and 121*d* passes through the second lens assembly 130 and the light emitting lens 140 or passes through the second lens assembly 130 but is not incident on the light emitting lens 140, thereby minimizing the glare phenomenon.

Here, the reference value for forming the pitch P1 between the collimator lenses 121*c* and 121*d* located at the center may be set in consideration of the shape of the first lens assembly 120, a spacing between the first lens assembly 120 and the second lens assembly 130, the shape of the second lens assembly 130, and the like.

In addition, in the optical device 100 according to an embodiment of the present disclosure, the pitch P1 between the collimator lenses 121*c* and 121*d* located at the center may be greater than a pitch between a pair of collimator lenses located at each of both edges in a left and right direction (the x-axis direction). In addition, a pitch between each pair of the plurality of collimator lenses 121*a*, 121*b*, 121*c*, 121*d*, and 121*e* may gradually decrease toward both edges in the left and right direction (the x-axis direction) from the center. That is, P1 in FIG. 7 may have a value greater than P2.

Accordingly, the optical device 100 according to an embodiment of the present disclosure may reduce a width of the first lens assembly 120 in the left and right direction (the x-axis direction) by reducing the pitch between each pair of the collimator lenses 121 toward an outer side of the first lens assembly 120 while securing the minimum pitch for controlling the glare. Therefore, the optical device 100 according to an embodiment of the present disclosure may be advantageous in securing the degree of freedom of design such as the shape, the size, and the arrangement of the lenses.

Figure 8:
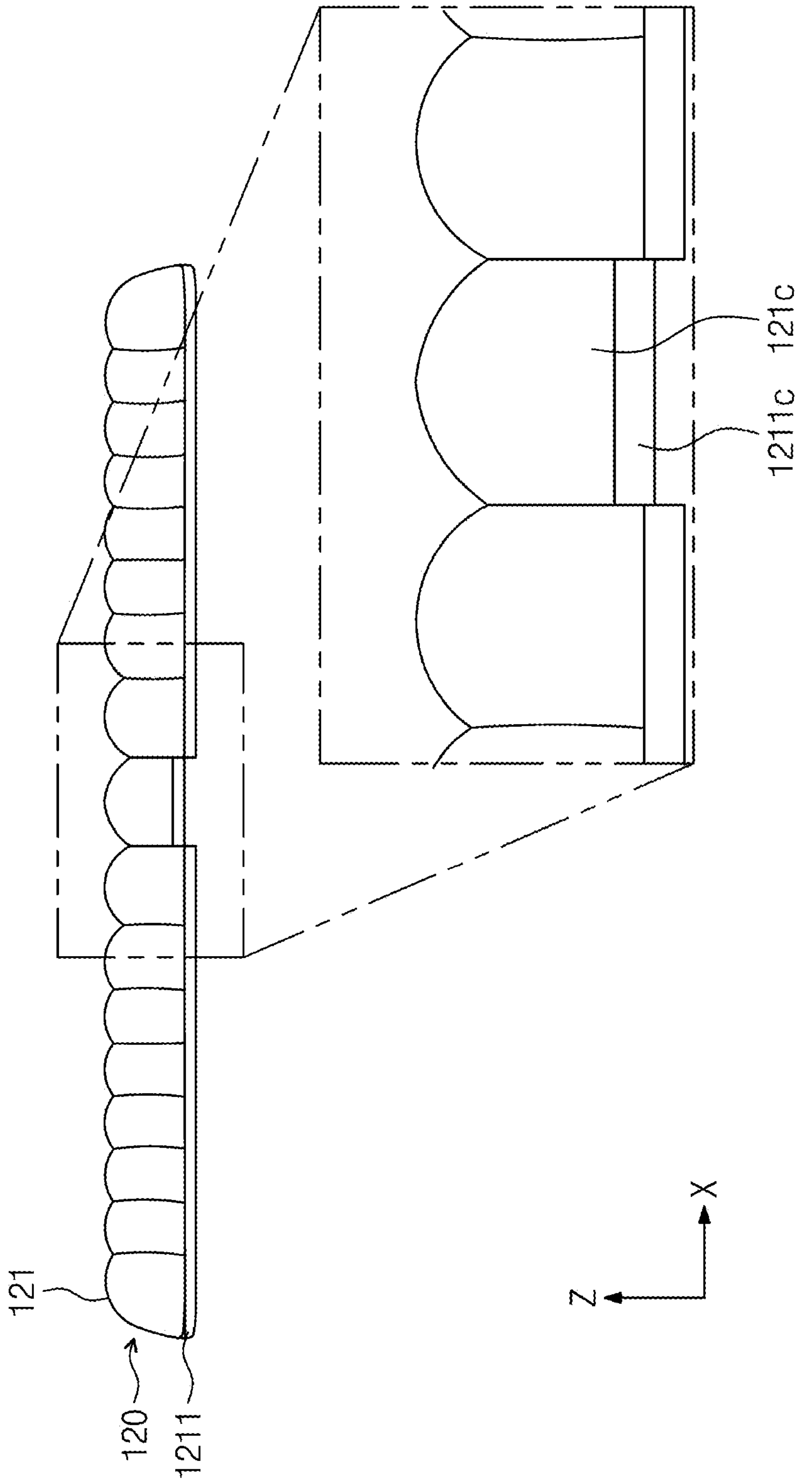
FIG. 8 is a diagram illustrating incident surfaces of collimator lenses according to an embodiment of the present disclosure.
Figure 9:
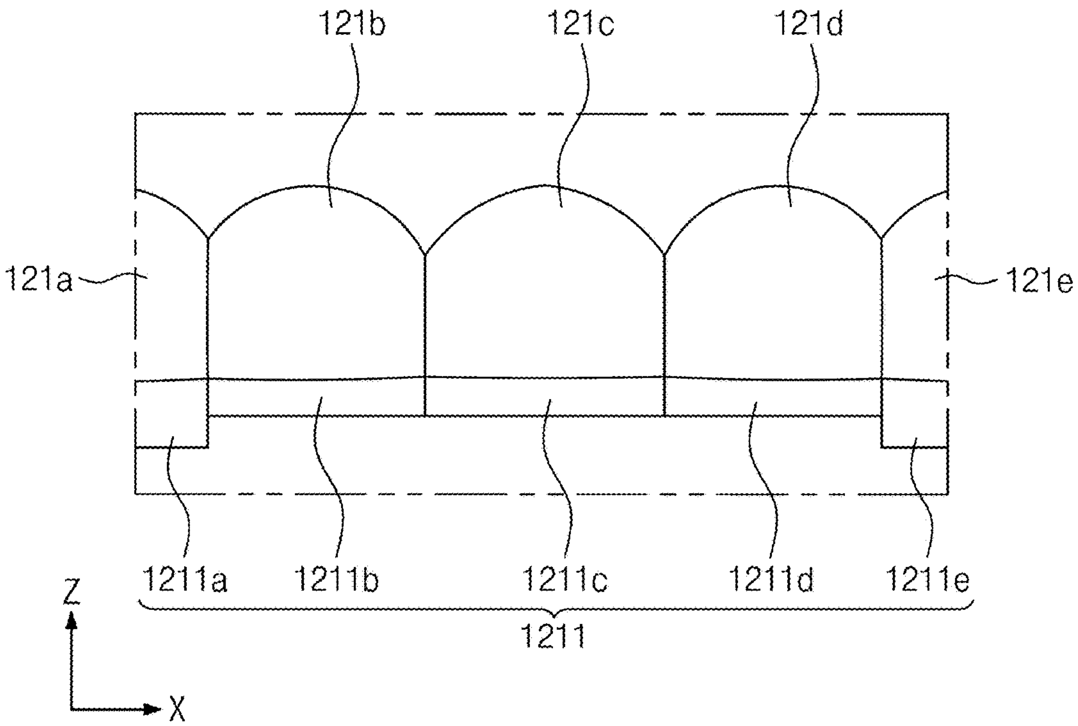
FIGS. 9 and 10 are diagrams illustrating incident surfaces of collimator lenses according to other embodiments of the present disclosure.
Figure 10:
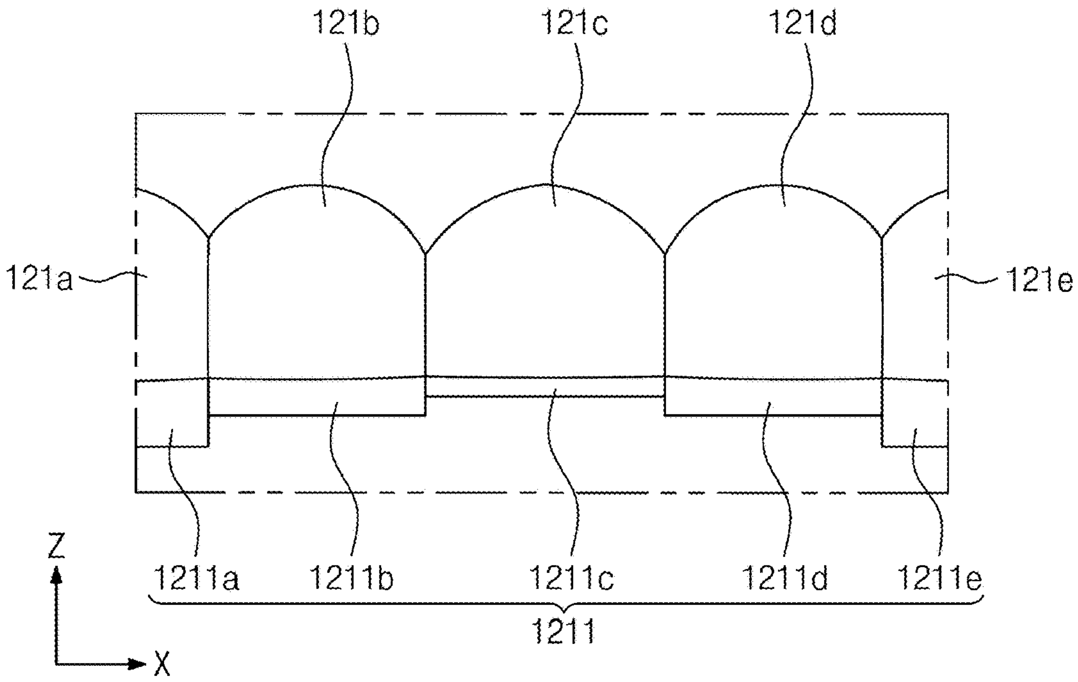

FIG. 8 is a diagram illustrating incident surfaces of collimator lenses according to an embodiment of the present disclosure, and FIGS. 9 and 10 are diagrams illustrating incident surfaces of collimator lenses according to other embodiments of the present disclosure.

As illustrated in FIG. 8, in the optical device 100 according to an embodiment of the present disclosure, an incident surface 1211*c* of the collimator lens 121*c* positioned at the center among the plurality of collimator lenses 121 may be stepped in the front and rear direction (the z-axis direction). Here, the collimator lens 121*c* located at the center may be a collimator lens 121*c* corresponding to a central segment area affecting the central luminous intensity.

That is, the optical device 100 according to an embodiment of the present disclosure may be designed such that focal lengths of the plurality of collimator lenses 121 constituting the first lens assembly 120 are not all the same, and a focal length of the collimator lenses 121*c* located at the center is different.

As illustrated in FIG. 8, in the optical device 100 according to an embodiment of the present disclosure, the incident surface 1211*c* of the collimator lens 121*c* located at the center may be formed to be stepped frontwards (the z-axis direction). Accordingly, the focal length of the collimator lens 121*c* located at the center of the first lens assembly 120 may be designed to be relatively greater than that of the collimator lens at the outer side of the first lens assembly 120.

This is because a performance of the ADB headlamp depends on a range within 10 degrees in the left and right direction from a center of the formed beam pattern. Accordingly, when the focal length at the center of the first lens assembly 120 forming the beam pattern within about 10-degree range is increased, the central luminous intensity may be increased and a width of the segment pattern may be reduced.

On the other hand, as the focal length increases, a light efficiency decreases. In this case, when the focal length at the outer side of the first lens assembly 120 where the width of the segment pattern is relatively not important is relatively smaller than that at the center of the first lens assembly 120, the overall decrease in the light efficiency may be solved.

Accordingly, in the optical device 100 according to an embodiment of the present disclosure, based on the above-described principle, incident surfaces 1211*b*, 1211*c*, and 1211*d* of the plurality of collimator lenses 121*b*, 121*c*, and 121*d* formed at the center of the first lens assembly 120 may be stepped frontwards (the z-axis direction) as illustrated in FIG. 9. In this regard, the respective steps formed by the incident surfaces 1211*b*, 1211*c*, and 1211*d* of the plurality of collimator lenses 121*b*, 121*c*, and 121*d* formed at the center may have the same depth.

That is, the optical device 100 according to an embodiment of the present disclosure may form the steps at the incident surfaces 1211*b*, 1211*c*, and 1211*d* of the collimator lenses 121*b*, 121*c*, and 121*d* corresponding to a central segment area affecting the central luminous intensity. In this case, as described above, the focal length at the center of the first lens assembly 120 may be increased to increase the central luminous intensity and reduce the width of the segment pattern.

In addition, as the focal length at the outer side of the first lens assembly 120 where the width of the segment pattern is relatively not important is relatively smaller than the focal length at the collimator lenses 121*b*, 121*c*, and 121*d* corresponding to the central segment area, the overall decrease in the light efficiency may be solved.

In addition, in the optical device 100 according to an embodiment of the present disclosure, the plurality of collimator lenses 121 may have different curvatures of the emission surfaces 122 in correspondence with distances to the light source array 110 based on the steps of the incident surfaces 1211.

That is, among the plurality of collimator lenses 121, the collimator lens (121*c* in FIGS. 8 and 121*b*, 121*c*, and 121*d* in FIG. 9) where the step of the incident surface 1211 is formed is the collimator lens 121 corresponding to the central segment area affecting the central luminous intensity. Further, as the step of the incident surface 1211 is formed and the distance to the light source array 110 increases, the curvature of the emission surface 122 may relatively small.

Furthermore, as described above, in the optical device 100 according to an embodiment of the present disclosure, to increase the focal length at the center of the first lens assembly 120 and allow the focal length at the outer side of the first lens assembly 120 to be relatively small, the incident surfaces 1211 of the plurality of collimator lenses 121 may be stepped in a staircase-like manner with different depths.

For example, in the optical device 100 according to an embodiment of the present disclosure, as illustrated in FIG. 10, the incident surfaces 1211*b*, 1211*c*, and 1211*d* of the plurality of collimator lenses 121*b*, 121*c*, and 121*d* formed at the center of the first lens assembly 120 may be stepped in the staircase-like manner with different depths.

Further, based on the above principle, in the optical device 100 according to an embodiment of the present disclosure, the plurality of collimator lenses 121 may be formed such that the incident surfaces 1211 thereof are stepped in the staircase-like manner with different depths from the collimator lens positioned at the center to the collimator lenses positioned at both edges in the left and right direction (the x-axis direction). Accordingly, the focal length at the center of the first lens assembly 120 may be designed to be relatively great to increase the central luminous intensity, and the performance of the ADB headlamp may be improved.

Although the plurality of collimator lenses 121 having the steps are illustrated as having the same width in the x-axis direction in the present embodiment, they may be formed to have different widths in respective areas. That is, the width of the first lens assembly 120 in the left and right direction (the x-axis direction) may be reduced by decreasing the pitch between each pair of collimator lenses 121 toward the outer side of the first lens assembly 120 having the steps.

In summary, the optical device and the vehicle equipped with the same according to the present disclosure may reduce the manufacturing and assembly costs by simplifying the structure of the lamp for the vehicle. In addition, the bi-function lamp may be implemented via the shape of the lens while arranging the LEDs of the light source array on the same plane.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

What is claimed is:

1. An optical device comprising:

a light source array outputting a light;

a first lens assembly disposed in front of the light source array and emitting light incident from the light source array frontwards thereof;

a second lens assembly disposed in front of the first lens assembly and emitting light incident from the first lens assembly frontwards thereof, and a light emitting lens forming a beam pattern using light incident from the second lens assembly, wherein the first lens assembly includes a plurality of collimator lenses corresponding to the light source array, wherein each of the plurality of collimator lenses includes an aspherical emission surface protruding convexly frontwards, and a pitch between adjacent two collimator lenses varies for each area, and wherein a pitch between adjacent two collimator lenses positioned at a center among the plurality of collimator lenses is greater than a pitch between adjacent two collimator lenses positioned at each of first and second edges in a left and right direction.

2. The optical device of claim 1, wherein the second lens assembly includes an aspherical upper incident surface protruding convexly rearwards thereof and a lower incident surface forming a continuous surface with the upper incident surface.

3. The optical device of claim 2, wherein a curvature in a vertical direction from a center of the upper incident surface and a curvature in the vertical direction from a center of the lower incident surface are different from each other.

4. The optical device of claim 3, wherein the lower incident surface includes an aspherical shape protruding convexly rearwards or recessed concavely frontwards.

5. The optical device of claim 3, wherein the lower incident surface includes a curved shape curved in a front and rear direction.

6. The optical device of claim 2, wherein the second lens assembly is formed by bonding an upper lens having the upper incident surface formed thereon with a lower lens having the lower incident surface formed thereon.

7. The optical device of claim 1, wherein the pitch between the adjacent two collimator lenses positioned at the center among the plurality of collimator lenses is equal to or greater than a reference value.

8. The optical device of claim 1, wherein the reference value is a minimum value allowing light emitted from collimator lenses adjacent to collimator lenses positioned at a center to pass through the second lens assembly, without being incident on the light emitting lens.

9. The optical device of claim 1, wherein the pitch between the adjacent two collimator lenses among the plurality of collimator lenses decreases from the center to the first and second edges in the left and right direction.

10. A vehicle comprising:

a vehicle body;

a lamp structure positioned on a front surface of the vehicle body; and an optical device embedded in the lamp structure, wherein the optical device includes:

a light source array outputting a light;

a first lens assembly disposed in front of the light source array and emitting light incident from the light source array frontwards thereof;

a second lens assembly disposed in front of the first lens assembly and emitting light incident from the first lens assembly frontwards thereof; and a light emitting lens forming a beam pattern using light incident from the second lens assembly, wherein the first lens assembly includes a plurality of collimator lenses corresponding to the light source array, wherein each of the plurality of collimator lenses includes an aspherical emission surface protruding convexly frontwards, wherein a pitch between adjacent two collimator lenses positioned at a center among the plurality of collimator lenses is equal to or greater than a reference value, and wherein the pitch between the adjacent two collimator lenses positioned at the center among the plurality of collimator lenses is greater than a pitch between adjacent two collimator lenses positioned at each of first and second edges in a left and right direction.

11. The vehicle of claim 10, wherein the second lens assembly includes an aspherical upper incident surface protruding convexly rearwards thereof and a lower incident surface forming a continuous surface with the upper incident surface.

12. The vehicle of claim 11, wherein a curvature in a vertical direction from a center of the upper incident surface and a curvature in the vertical direction from a center of the lower incident surface are different from each other.

13. The vehicle of claim 12, wherein the lower incident surface includes an aspherical shape protruding convexly rearwards or recessed concavely frontwards.

14. The vehicle of claim 12, wherein the lower incident surface includes a curved shape curved in a front and rear direction.

15. The vehicle of claim 11, wherein the second lens assembly is formed by bonding an upper lens having the upper incident surface formed thereon with a lower lens having the lower incident surface formed thereon.

16. The vehicle of claim 10, wherein the reference value is a minimum value allowing light emitted from collimator lenses adjacent to collimator lenses positioned at a center to pass through the second lens assembly, without being incident on the light emitting lens.

17. The vehicle of claim 10, wherein the pitch between the adjacent two collimator lenses among the plurality of collimator lenses decreases from the center to the first and second edges in the left and right direction.

* * * * *